United States Patent
Hsiao

(10) Patent No.: US 7,351,080 B2
(45) Date of Patent: Apr. 1, 2008

(54) CARD CONNECTOR WITH EJECTOR

(75) Inventor: Hsueh-Lung Hsiao, Tu-Cheng (TW)

(73) Assignee: Hon Hai Precision Ind. Co., Ltd., Taipei Hsien (TW)

( * ) Notice: Subject to any disclaimer, the term of this patent is extended or adjusted under 35 U.S.C. 154(b) by 0 days.

(21) Appl. No.: 11/638,334

(22) Filed: Dec. 12, 2006

(65) Prior Publication Data

US 2007/0134959 A1    Jun. 14, 2007

(30) Foreign Application Priority Data

Dec. 12, 2005   (TW)   ............................. 94143789 A

(51) Int. Cl.
*H01R 24/00*   (2006.01)
(52) U.S. Cl. ..................................... 439/159; 439/630
(58) Field of Classification Search ............... 439/155, 439/159, 630
See application file for complete search history.

(56) References Cited

U.S. PATENT DOCUMENTS

| | | | | |
|---|---|---|---|---|
| 5,890,920 A | * | 4/1999 | David et al. | 439/159 |
| 5,993,227 A | * | 11/1999 | Hsia et al. | 439/159 |
| 6,482,020 B1 | * | 11/2002 | Yeh | 439/159 |
| 6,641,413 B2 | | 11/2003 | Kuroda | |
| 2002/0008142 A1 | * | 1/2002 | Takayasu et al. | 235/441 |

* cited by examiner

*Primary Examiner*—Thanh-Tam Le
(74) *Attorney, Agent, or Firm*—Wei Te Chung

(57) ABSTRACT

A card connector adapted for receiving a first card and a second comprises an insulating housing defining a space for the cards, a plurality of contacts for electrically with corresponding card and an ejector. The ejector comprises a first slider, a first spring a second slider, a second spring and a locking member being able to lock the first slider and the second slider in a final position. When the first card inserts into the card connector, the first slider is pushed and compresses the first spring, while the second slider keeping in an original position; when the second card inserts into the card connector, the second slider is pushed and compresses the second spring, while the second slider brings the first slider to move and to compresses the first spring.

14 Claims, 10 Drawing Sheets

CARD CONNECTOR WITH EJECTOR

BACKGROUND OF THE INVENTION

1. Field of the Invention

The present invention is generally related to a card connector, and especially to a card connector which is adapted for insertion/ejecting of a card.

2. Description of Related Art

A card connector is generally used as an expanded recording apparatus of an electronic equipment such as a personal computer or a digital camera. PC card or memory card is installed in the card connector to electrically connect with the card connector for writing and reading necessary information. In recent years, as small memory cards, various kinds of memory cards having different shapes, such as a long one, a short one, a thick one, or a thin one, have been developed, and an N-in-1 card connector adapted for at least two cards in different kinds is desired to enhance an applicability of the electronic equipment. And such an N-in-1 card connector also need ejector for ejecting the cards received therein.

U.S. Pat. No. 6,641,413 discloses a card connector adapted for a first card with a short and wide type and a second card with a long and thin type, the card connector comprises an insulting housing, a plurality of first contacts and second contacts and an ejector. The ejector includes a slider with a heard groove, a spring and a metal pin. The first contacts and the second contacts are arrayed in two rows along an card insertion direction and respectively used for electrically with the first card and the second card. The slider is movable along a card inserting/ejecting direction and has a first engaging portion and a second engaging portion in an inner side thereof. When the first card inserts into the card connector, the first card will push the first engaging portion of the slider and bring the slider to move forwardly and be locked at a final position, where the first card electrically contacts with the first contacts completely. When the second card inserts into the card connector, a front portion of the second card will pass the first engaging portion and push the second engaging portion of the slider, then bring the slider to move forwardly and be locked together at the final position, where the second card electrically contacts with the second contacts completely. The ejector is able to engaging with two different cards in virtue of differences in shape between different cards. However, whether inserting the first card or the second card, the slider is pushed to move and the spring is compressed, so the spring may get an elastic distortion after being used frequently.

Hence, an improved card connector is highly desired to overcome the aforementioned disadvantages of the prior art.

SUMMARY OF THE INVENTION

Accordingly, an object of the present invention is to provide a card connector, which has an ejector being able to engaging with two different cards.

To achieve the above object, a card connector adapted for a first card and a second card, comprises an insulating housing defining a space for accommodating the cards and a card insertion/ejecting direction, a plurality of contacts received in the insulating housing for electrically connecting with the cards and an ejector. The ejector comprises a first slider, a second slider, a first spring and a second spring and a locking member being able to lock the first slider and the second slider in a final position, and the first slider and the second slider are movable along the card insertion/ejecting direction. The first slider is pushed by the first card and compresses the first spring, while the second slider keeps in an original position; the second slider is pushed by the second card and compresses the second spring, while the second slider pushes the first slider to move and to compress the first spring.

Other objects, advantages and novel features of the present invention will be drawn from the following detailed description of a preferred embodiment of the present invention with attached drawings.

DETAILED DESCRIPTION OF THE INVENTION

Reference will now be made in detail to the preferred embodiment of the present invention.

Figure 1:
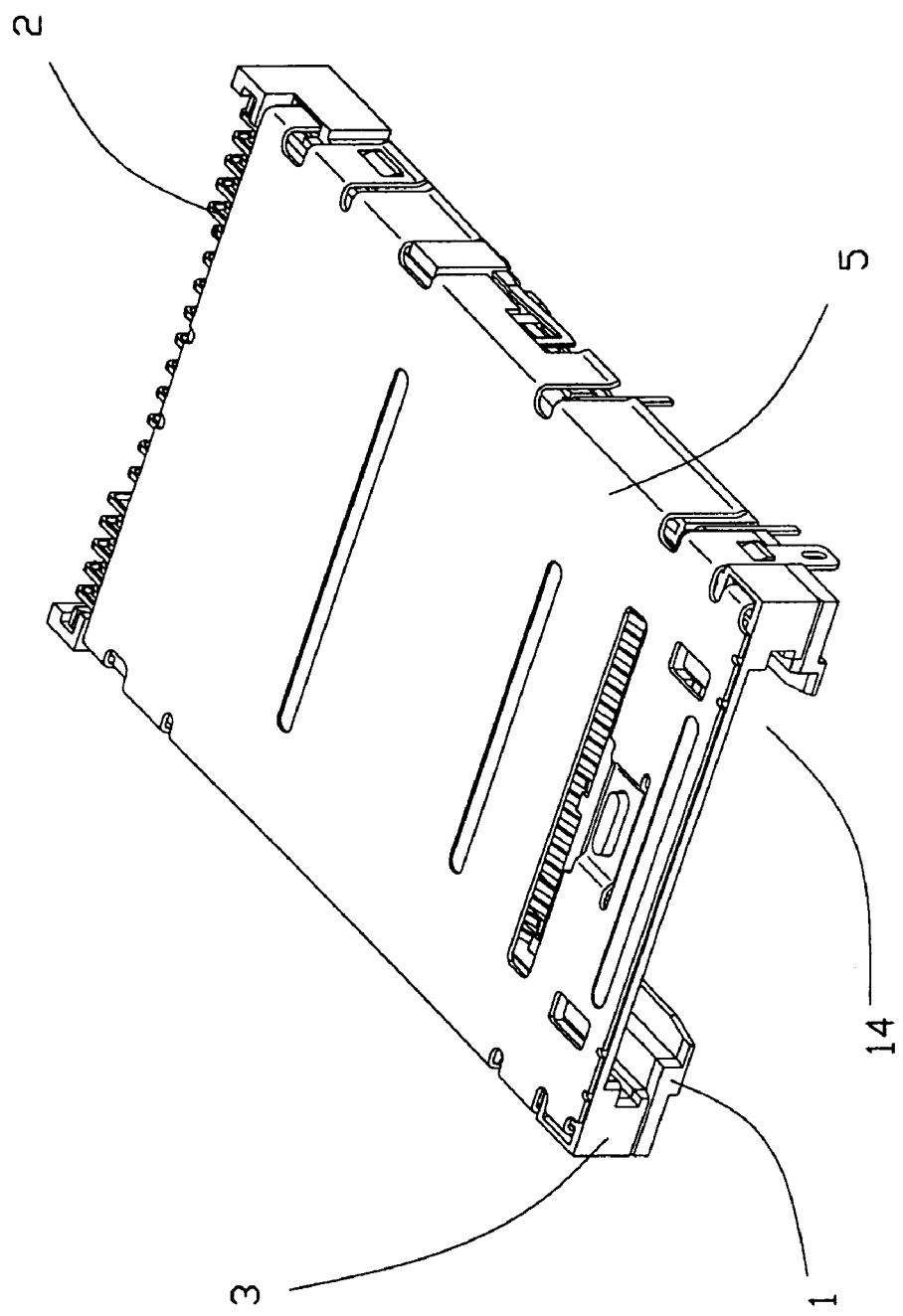
FIG. 1 is an assembled, perspective view of a card connector in accordance with the present invention.
Figure 2:
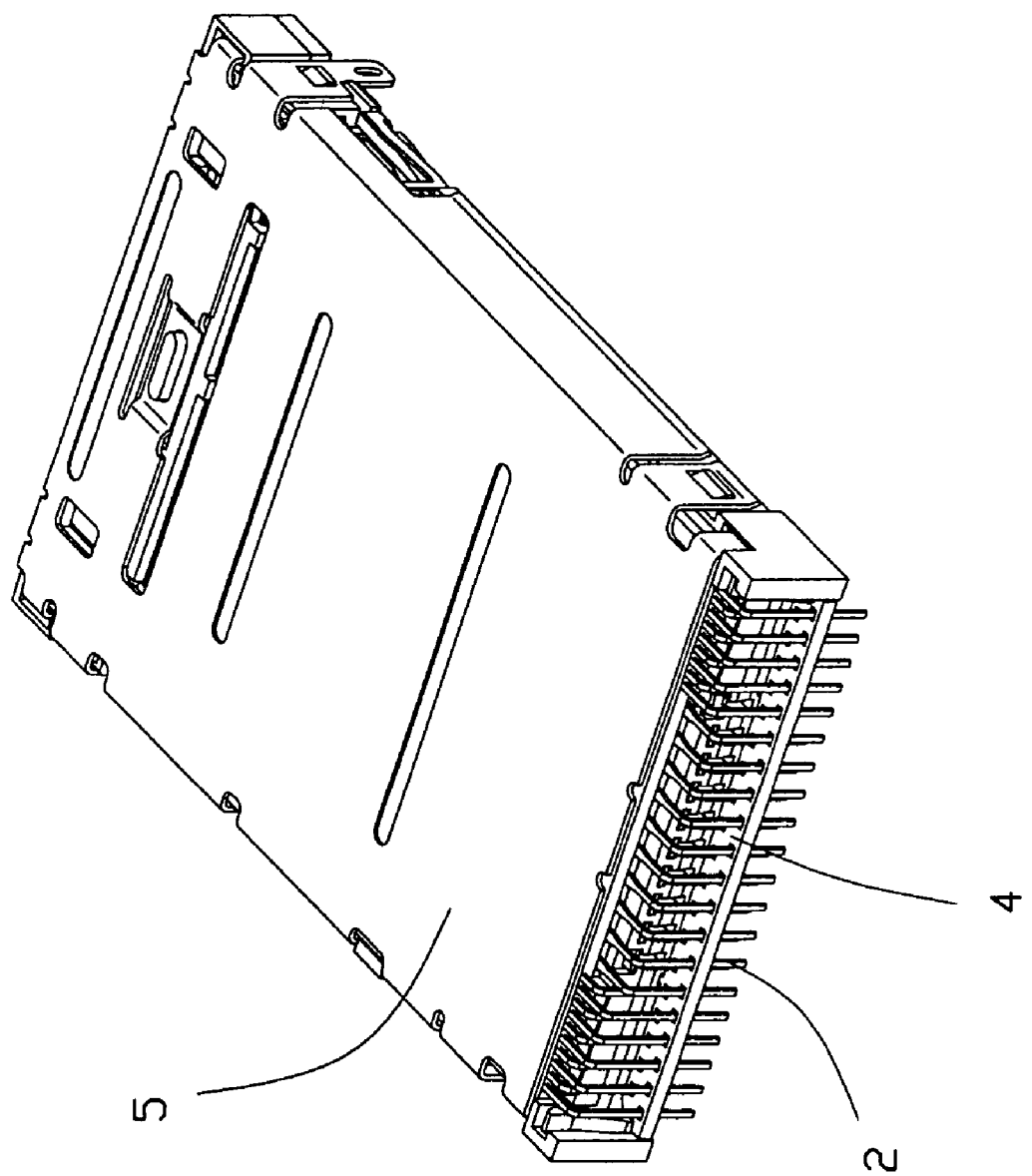
FIG. 2 is another assembled, perspective view of the card connector in accordance with the present invention.

Referring to FIG. 1 and FIG. 2, the card connector in accordance with the present invention is adapted for different cards, such as XD (XD-picture) card, MS (Memory Stick) card, SD (Super Density, Secure Digital) card and MMC (Multi-Media card). The card connector comprises an insulating housing 1, a plurality of contacts 2 received in the insulating housing 1, a bridge 3, a spacer 4, a shell 5 covering the insulating housing 1 and ejectors (not labeled). The bridge 3 is assembled in a front end of the insulating housing 1 to define an inserting port 14 together with the arms 11 of the insulating housing 1, the spacer 4 is set in a rear end of the insulating housing 1 for guiding and retaining the contacts 2 to a print circuit board (not shown).

Figure 3:
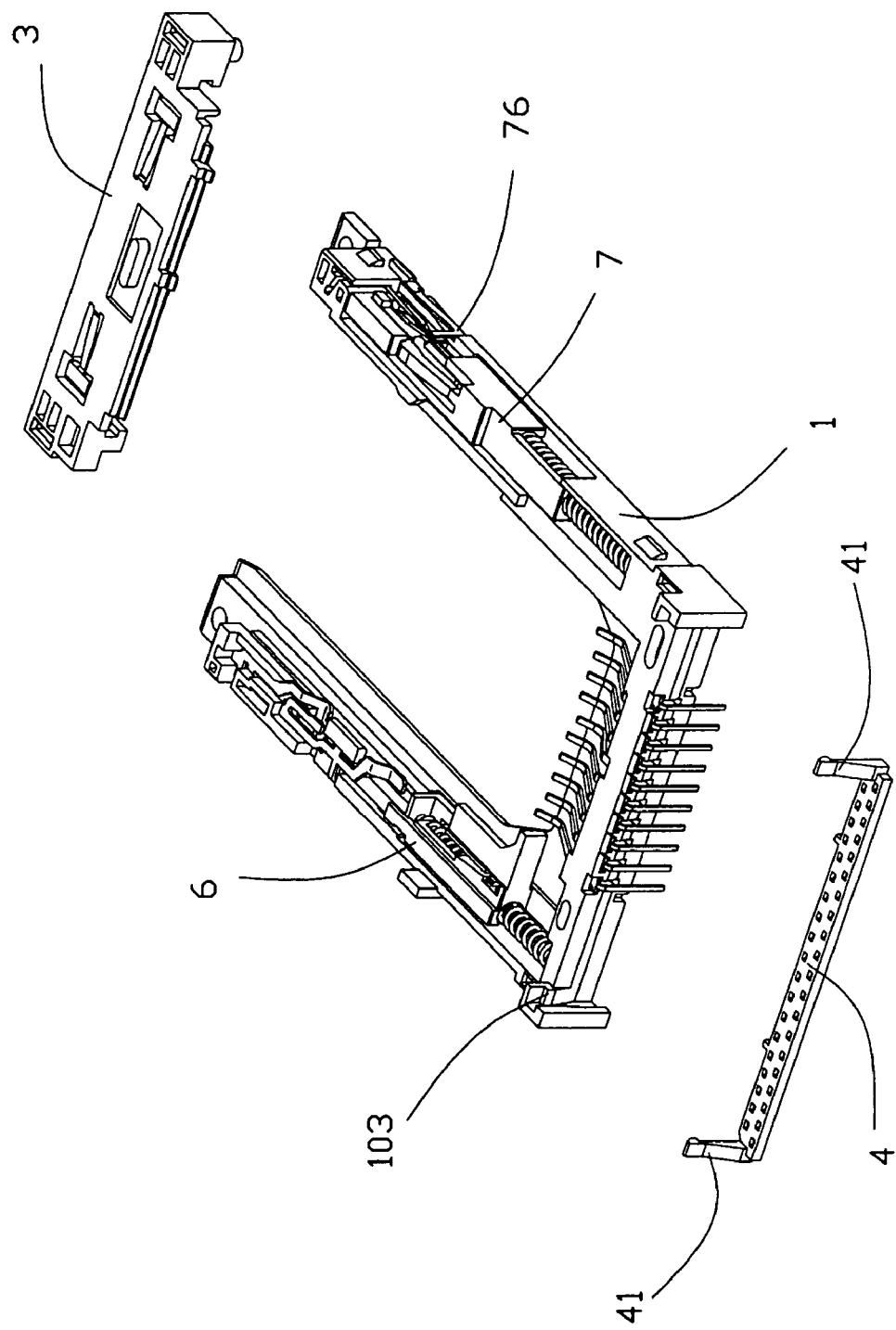
FIG. 3 is a partially assembled, perspective view of the card connector in accordance with the present invention.
Figure 4:
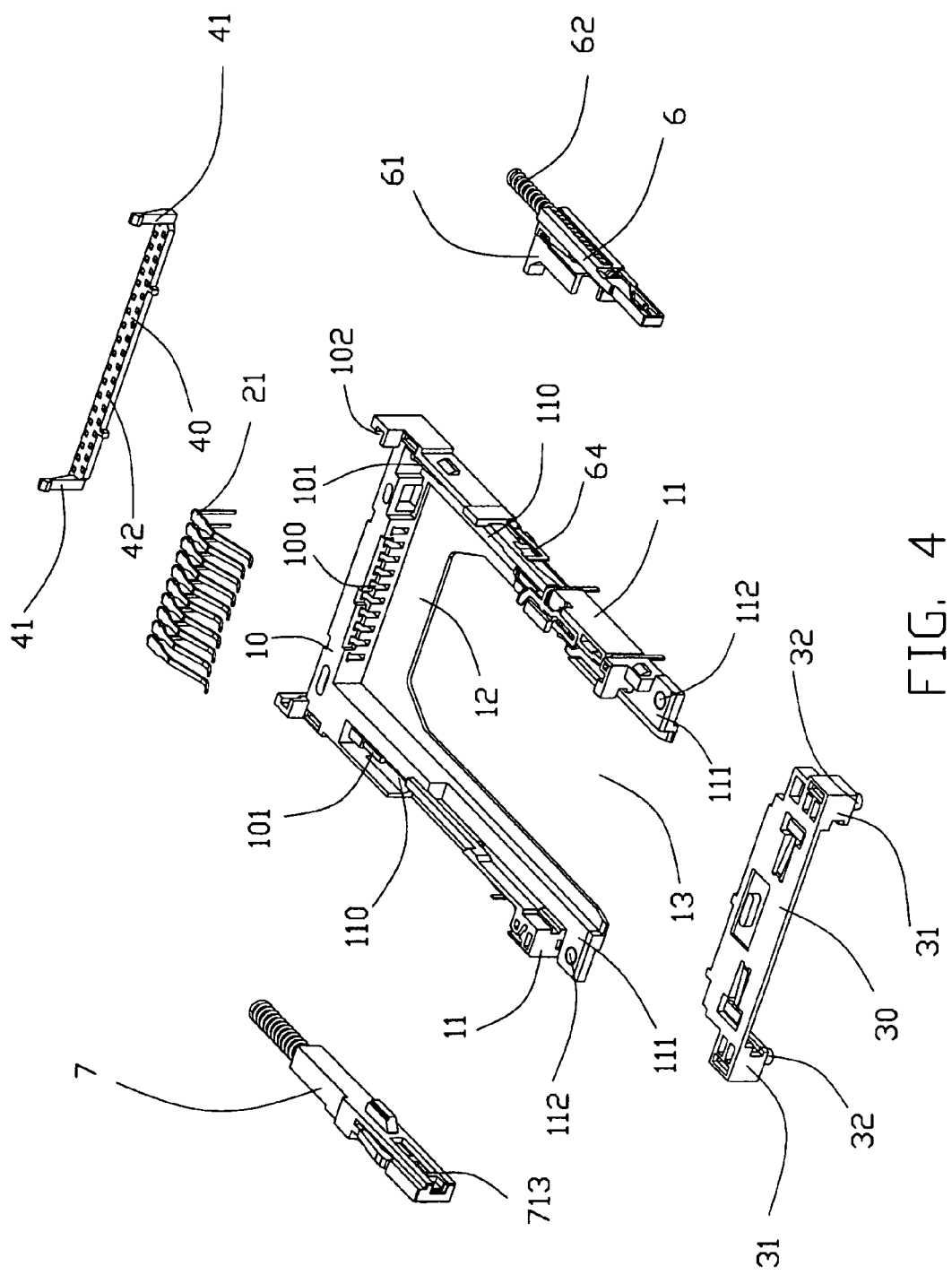
FIG. 4 is another partially assembled, perspective view of the card connector in accordance with the present invention.

Referring to FIG. 3 and FIG. 4, the insulating housing 1 is in an U-shape and comprising a rear wall 10, a right and a left arms 11 extending from lateral sides of the rear wall 10 and an U-shaped bottom wall 12 linking the rear wall 10 and the arms 11, the rear wall 10, two arms 11 and the bottom wall 12 define a space 13 for the cards. Each arm 11 defines a slot 110 for receiving corresponding ejector, the right arm 11 receives a switch means (not labeled). The rear wall 10 is formed with a plurality of passages 100 and a pair of guiding posts 101 respectively extending in to the slots 110, Each arm 11 is formed with an engaging portion 111 on a front end far from the rear wall 10, each engaging portion 111 defines an engaging hole 112. A room 102 is defined on a rear side of the rear wall 10 for receiving the spacer 4 and provides a pair of latching protrusions 103 on opposed ends thereof.

Referring to FIG. 3 and FIG. 4, and conjoining with FIG. 1 and FIG. 2, the bridge 3 is approximately in an upside-down U-shape and comprises an horizontal board 30 and two lateral boards 31 extending from lateral ends of the horizontal board 30. Each lateral board 31 is provided with an engaging pole 32 on a bottom surface thereof, which engages with and fixes to corresponding engaging holes 112 of the insulating housing 1 in a hot-melt process to assemble the bridge 3 to a front end of the insulating housing 1. The bridge 3 is formed with a plurality of guiding faces (not labeled) on inner sides thereof and defines the inserting port 14 together with the front ends of the arms 11 of the insulating housing 1.

The spacer 4 is approximately in an U-shape and comprises an transverse board 40 and two latching arms 41, the transverse board 40 is formed with a plurality of through hole 42 for the contacts 2 passing through. The spacer 4 inserts into the room 102 of the insulating housing 1 from bottom to top, the latching arms 41 engage with the latching protrusions 103 to fix the spacer 4 to the insulating housing 1.

Figure 5:
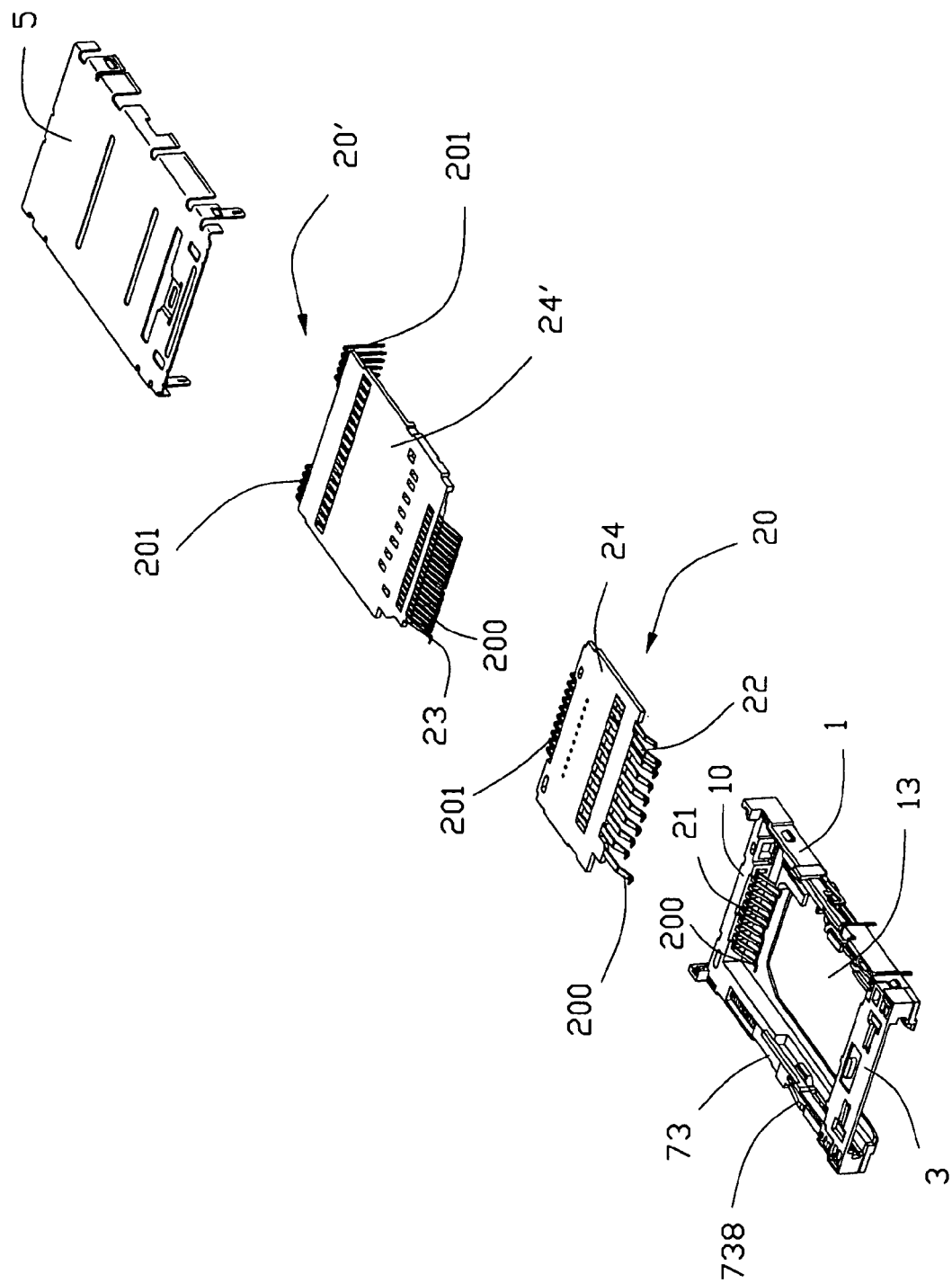
FIG. 5 is an exploded, perspective view of the card connector in accordance with the present invention.
Figure 6:
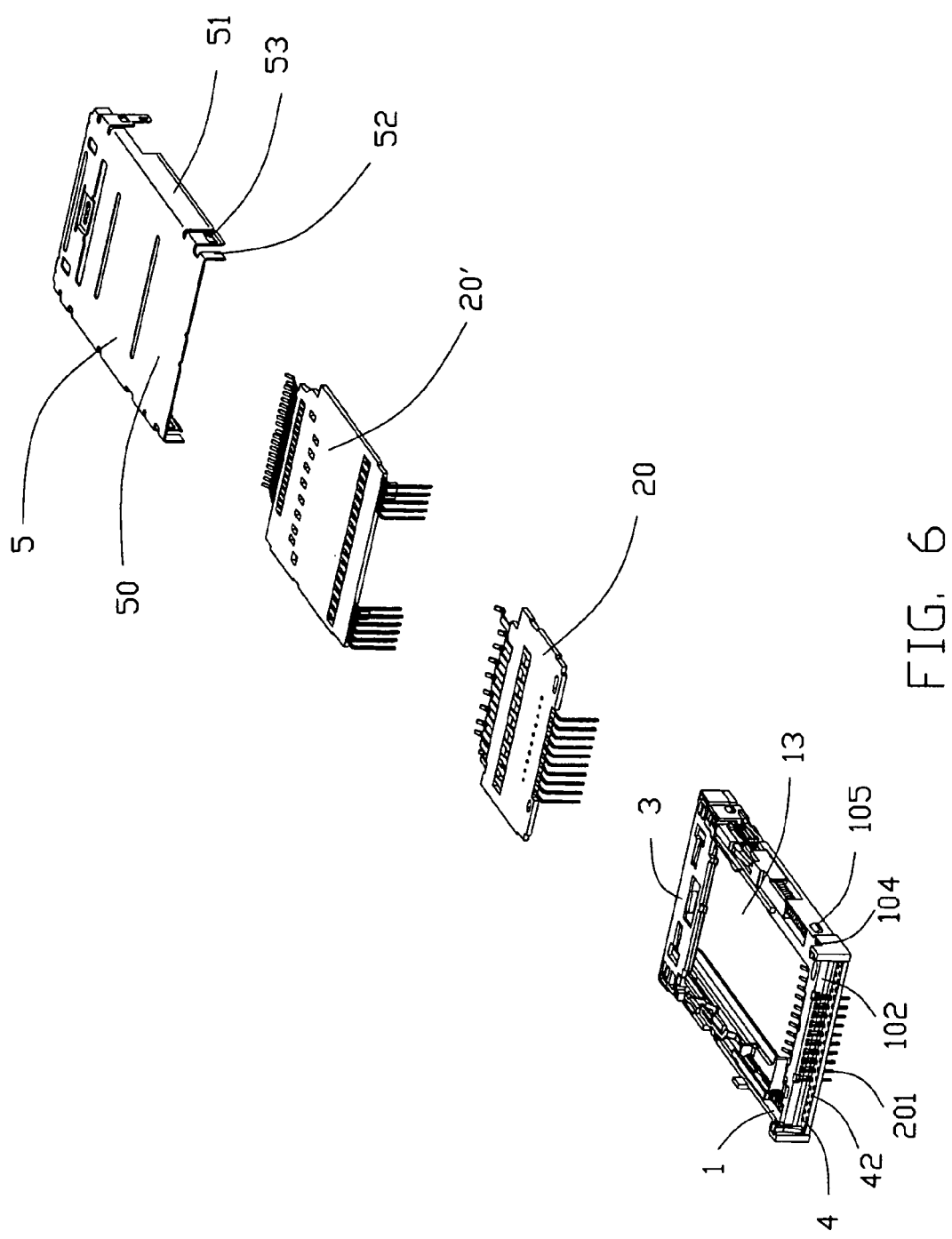
FIG. 6 is another exploded, perspective view of the card connector in accordance with the present invention taken from another side.
Figure 7:
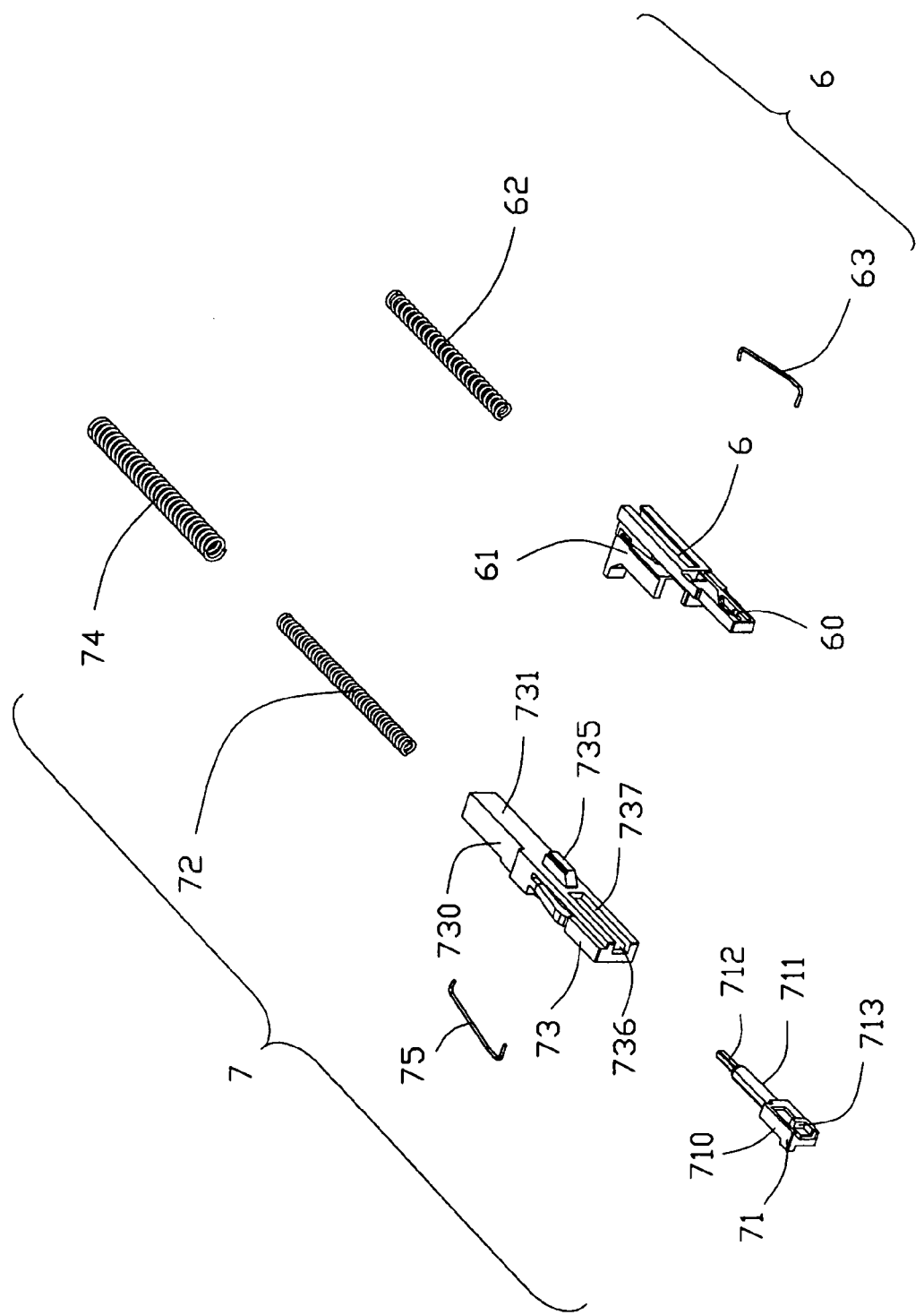
FIG. 7 is an exploded, perspective view of an ejector of the card connector in accordance with the present invention.
Figure 8:
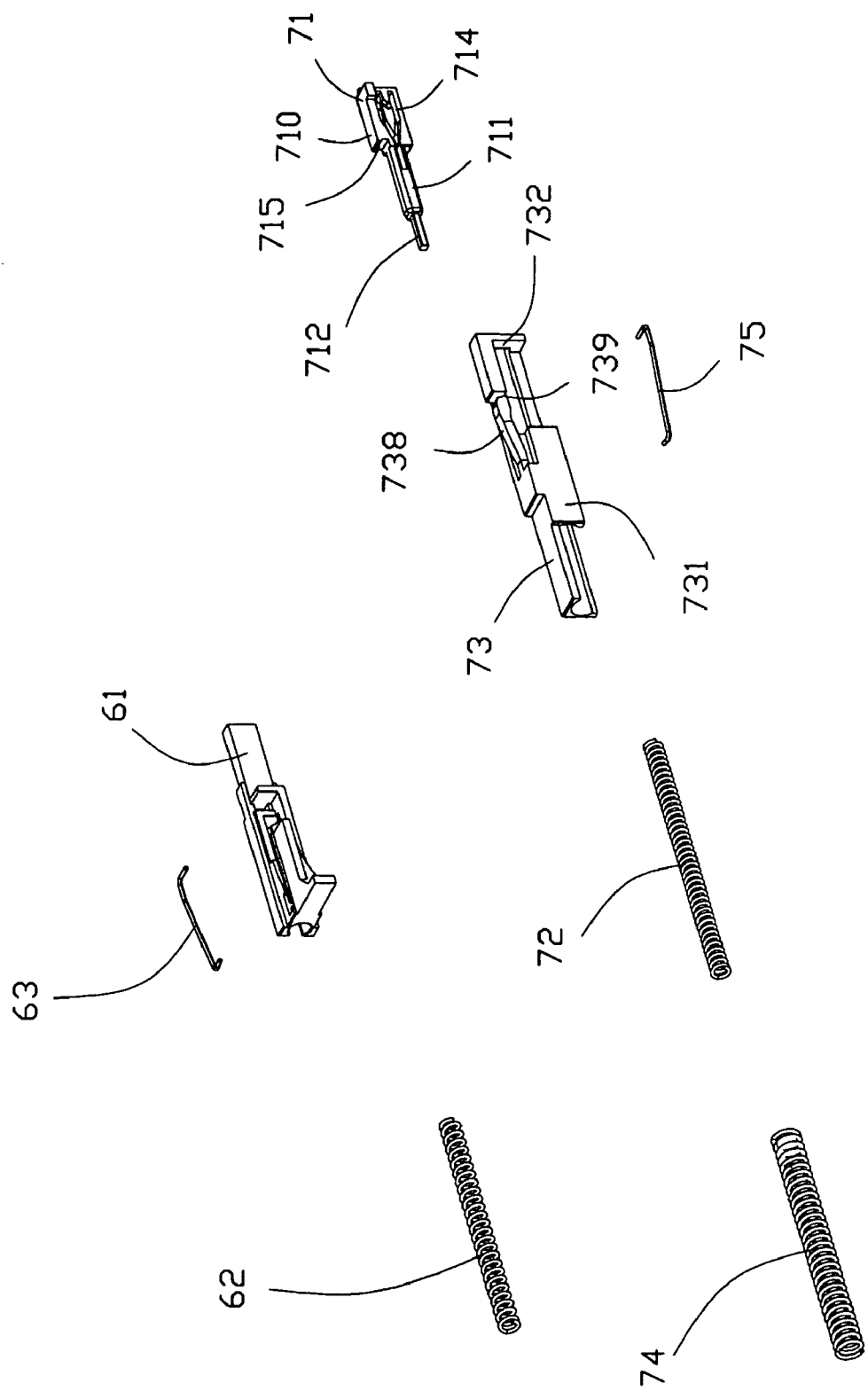
FIG. 8 is another exploded, perspective view of the ejector shown in FIG. 7.
Figure 9:
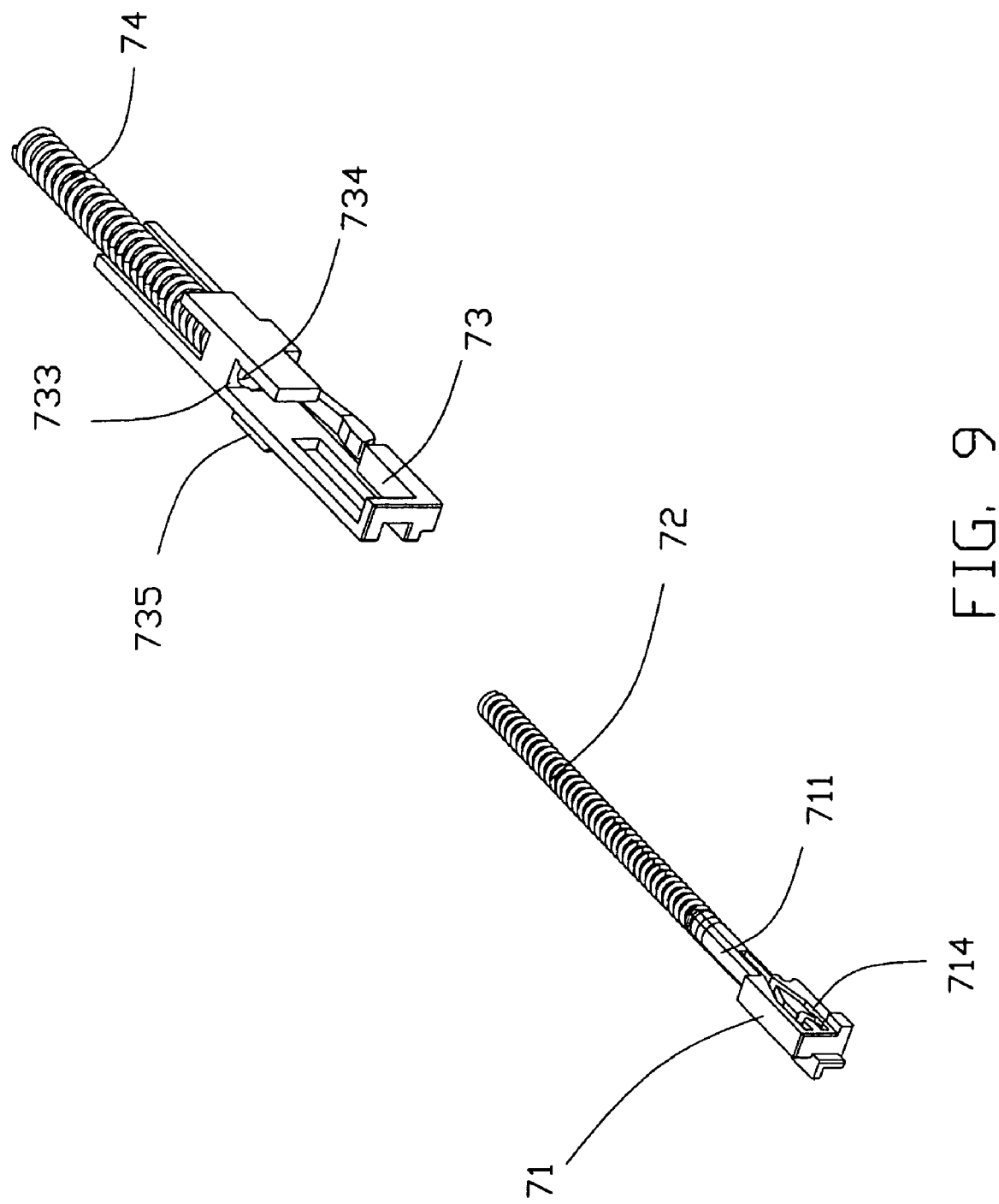
FIG. 9 is an exploded, perspective view of another ejector of the card connector in accordance with the present invention.
Figure 10:
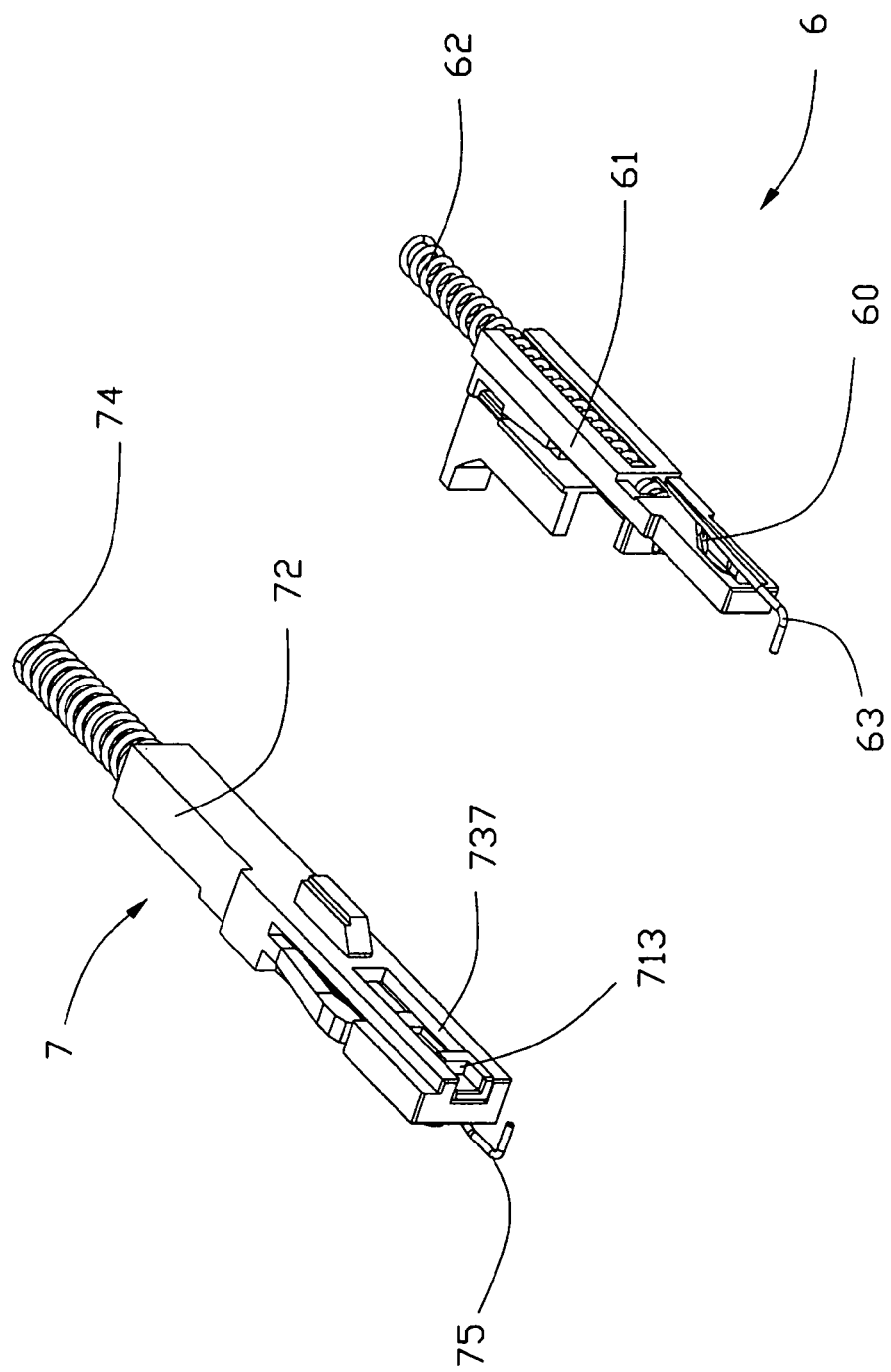
FIG. 10 is an assembled, perspective view of the ejectors of the card connector in accordance with the present invention.

Referring to FIG. 5 and FIG. 6, the contacts 2 includes a plurality of first contacts 21 for MS card, a plurality of second contacts 22 for SD/MMC card, a plurality of third contacts 23 for XD card. The second contacts 22 is retained to a first insulating board 24 to form a first contact module 20 together, the third contacts 23 is retained to a second insulating board 24' to form a second contact module 20'. Each contact 2 has a contacting portion 200 for contacting with corresponding card and a tail 201 for being soldered to the print circuit board. The contacting portions 200 of the second contacts 22 and the third contacts 23 respectively extend from front edges of the insulating boards 24, 24' to the space 13, and the corresponding tails 201 extend from rear edges of the insulating board 24, 24' downwardly. Wherein, the tails 201 of the third contacts 23 are divided into two groups to extend downwardly with a space between for setting the tails of the second contacts 22.

Conjoining with FIG. 1 and FIG. 2, the first contacts 21 are inserted into and retained to the passages 100 of the rear wall 10 from a rear face of the insulating housing 1, after that, the spacer 4 is assembled to the room 102 of the insulating housing 1, and then the first and the second contact modules 20, 20' are assembled to the insulating housing 1 from top to bottom in turn, all the contacting portions 200 are extending into the space 13 and all the tails 201 are extending through the through hole 42 of the spacer 4 and beyond the insulating housing 1 for being soldered to the print circuit board.

Referring to FIG. 5 and FIG. 6, the shell 5 comprises a top plate 50 and oppose side walls 51 and is formed with a plurality of latching pieces 52 and latching holes 53, and the insulating housing 1 is correspondingly formed with a plurality of latching slots 104 and projection portions 105, the shell 5 fixes to the insulating housing 1 in virtue of engaging of the latching pieces 52 and the latching slots 104 and engaging of the latching hole 53 and the projecting portion 105 to cover the insulating housing 1 and the second contact module 20'.

Referring to FIG. 7 to FIG. 10, and conjoining with FIG. 3 and FIG. 4, the ejectors include a first ejector 6 and a second ejector 7. The first ejector 6 is used for ejecting the MS card and comprises a slider 61 with a heart groove 60, a spring 62 and a guiding pin 63. The slider 61 is movable received in the slot 110 of the right arm 11 of the insulating housing 1; the spring 62 is disposed between the slider 61 and the insulating housing 1, with one end received in a hole (not labeled) defined on a rear end of the slider 61 and the other end surrounding the guiding post 101 of the insulating housing 1; the guiding pin 63 is a metal haulm with two ends, one end retained to the arm 11 of the insulating housing 1 and the other end movably disposed in the heart groove 60. An elastic finger 64 (referring to FIG. 4) is fixed to the arm 11 of the insulating housing 1 and presses the guiding pin 63 toward the heart groove 60 to prevent the guiding pin 63 from jumping out of the heart groove 60. The first ejector 6 is a normal push-push type, an insertion of the MS card will push the slider 61 to move and be locked at a final position, and pushing the MS card again to release the locking of the slider 61 and eject the MS card out by an elastic force of the spring 62.

The second ejector is used for XD card and SD/MMC card and comprises a first slider 71 formed with a heart groove 714, a first spring 72, a second slider 73, a second spring 74 and a guiding pin 75. The first slider 71 is received in the second slider 73, the first spring 72 is surrounded by the second spring 74, the sliders 71, 73 share a locking means composed by the heart groove 714 and the guiding pin 75. An elastic piece 76 is provided to press the guiding pin 75.

The first slider has a base 710, a first column 711 rearward extending from the base 710 and a second column 712 further rearward extending from the first column 711, a diameter of the second column 712 being smaller than the diameter of the first column 711. The base 710 is formed with a first ejecting arm 713 at an inner side faced to space 13 and the heart groove 714 at an out side opposed to the inner side. Both the first and the second columns 711, 712 are able to insert into the first spring 72.

The second slider 73 is a hollow frame and comprises a top wall 730, two opposed sidewalls 731, a front wall 732 and a transverse wall 731 linking the two sidewalls 731 and dividing a space (not labeled) within the second slider 73 into a front part and a rear part. An aperture 734 is defined in the transverse wall 731 for communicating the front part and the rear part of the space (not labeled). The second slider 73 is formed with a second ejecting arm 735 in the inner sidewall 731.

When assembly, the first slider 71 inserts into the second slider 73 from a bottom face of the second slider 73, with the base 710 being in front of the transverse wall 733 and the second column 712 passing through the aperture 734 to being in the rear of the transverse wall 733; The first spring 72 installs into the second slider 73 from a rear face of the second slider 73 and passes through the aperture 734 to surround the first and the second columns 711, 712 of the first slider 71; The second spring 74 surrounds the first spring 72 and just locates in the rear of the transverse wall 733 of the second slider 73 since the second spring 74 has a diameter larger than the diameter of the aperture 734. The out sidewall 731 and the front wall 732 of the second slider 73 define a gap therebetween to expose the heart groove 714. Then, put said partially assembled second ejector 7 in the slot 110 of the left arm 11 the insulating housing 1. The guiding pin 75 is a metal haulm with two ends, one end retained to the left arm 11 of the insulating housing 1 and the other end movably disposed in the heart groove 714. The elastic finger 76 is fixed to the left arm 11 and presses the guiding pin 75 toward the heart groove 714 to prevent the guiding pin 75 from jumping out of the heart groove 714.

The front wall 732 of the second slider 73 defines a hole 736 and a narrow slot 737 through the inner sidewall 731 and communicates with the hole 736, the high of the slot 737 is larger than a thickness of the XD card and smaller than a thickness of the SD/MMC card. The ejecting arm 713 of the base 710 of the first slider 71 is located behind the hole 736 and in the narrow slot 737 and is able to be directly pushed by the XD card. The base 710 of the first slider 71 defines a nick 715 forwardly recessed near the top surface thereof, and the second slider 7 correspondingly provides an elastic arm 738 extending forwardly and upwardly from the top wall 730, the elastic arm 738 has a latching portion 739 to engage with the nick 715 on a front end thereof.

The insulating board 24 of the first contact module 20 covers the second slider 73 and locates in the rear of the elastic arm 738, when the first slider 71 and the second slider 73 rearward slide together, the upward extending portion of the elastic arm 738 of the second slider 73 will be pressed by the insulating board 24, and the latching portion 739 will insert into the nick 715 of the first slider 71. By this means, the second slider 73 is locked to the first slider and unable to move forwardly solely, which is also a card ejection direction, when the first slider 71 is locked in a final position.

Details during the insertion of card into the card connector will be describe here. When the SD/MMC card inserting into the card connector, for the SD/MMC card is thicker than the XD card, the SD/MMC card can not move along the narrow slot 737 of the first slider 71, so the SD/MMC card passes the first ejecting arm 713 and directly pushes the second ejecting arm 735 of the second slider 73, and then brings the second slider 73 to further move rearward and causes a distortion the second spring 74. At the same time, the front wall 732 of the second slider 73 will push the first slider 71 to move rearward together and causes a distortion the first spring 71, the first insulating board 24 of the first contact module 20 gradually presses the elastic arm 738 of the second slider 73 to inert into the nick 715 of the first slider 71 for locking the second slider 73 to the first slider 71. At last, the guiding pin 75 cooperates with the heart groove 714 of the first slider 71 in locking the first slider 71, the second slider 73 and the SD/MMC card in the final position. Push the SD/MMC card again to release the locking, then the first spring 72 and the second spring 74 urge the first slider 71, the second slider 73 and the SD/MMC card back to an original position to ejecting the SD/MMC card. And the elastic arm 738 leaves the insulating board 24 and the latching portion 739 moves out from the nick 715 to an original state in this card ejecting process.

When the XD card inserting into the card connector, an lateral edge of the second slider 73 moves along the hole 736 and the narrow slot 737 and directly pushes the first ejecting arm 713 of the first slider 71. The first slider 71 is brought to move rearward and compresses the first spring 72. For the first column 711 and the second column 712 are able to move through the aperture 734 of the second slider 73, the first slider 71 will not bring the second slider 73 to move and the second spring 74 will not be compressed. Push the XD card again to release the locking, then, the first spring 72 urges the first slider 71 and the XD card back to an original position to ejecting the XD card.

While a preferred embodiment in accordance with the present invention has been shown and described, equivalent modifications and changes known to persons skilled in the art according to the spirit of the present invention are considered within the scope of the present invention as described in the appended claims.

What is claimed is:

1. A card connector adapted for a first card and a second card comprising:
   an insulating housing defining a card insertion/ejecting direction and a space for accommodating the first card and the second card;
   a plurality of contacts received in the insulating housing for electrically connecting with the first card and the second card; and
   an ejector received in the insulating housing and comprising a first slider, a first spring, a second slider, a second spring and a locking member being able to lock the first slider and the second slider in a final position, the first slider and the second slider being movable along the card insertion/ejecting direction, when the first card being inserted into the space, the first slider being pushed by the first card and compressing the first spring, while the second slider keeping in an original position; when the second card being inserted into the space, the second slider being pushed by the second card and compressing the second spring, while the second slider pushing the first slider to move and to compress the first spring;
   wherein the second slider is formed with an elastic arm extending upwardly and forwardly and having a latching portion on a front end, the first slider is correspondingly formed with a nick, when the elastic arm is pressed downwardly, the latching portion is forced to engage with the nick for locking the second slider to the first slider.

2. The card connector as described in claim 1, wherein the locking member has a heart groove defined on the first slider and a guiding pin with two ends, one end retained to the insulating housing and the other end being movable in the heart groove.

3. The card connector as described in claim 2, wherein the second slider is locked to the first slider and prevented from moving in the card ejecting direction at the final position.

4. The card connector as described in claim 3, wherein the first spring is located between the first slider and the insulating housing, the second spring is located between the second slider and the insulating housing, the first slider is moveable received in the second slider, and the first spring is surrounded by the second spring.

5. The card connector as described in claim 4, wherein the second slider has a front wall in front of the first slider, the front wall will push the first slider to move when the second slider moves rearward.

6. The card connector as described in claim 5, wherein the first slider has a first ejecting arm, the second slider has a second ejecting arm exposing in the space and a slot communicating with the space, the first ejecting arm is located in the slot and in front of the second ejecting arm, the first card is unable to contact the first ejecting arm, and the second card is able to move along the slot and contact the first ejecting arm.

7. The card connector as described in claim 6, wherein the second slider has a transverse wall with an aperture, the first slider is formed with a column on rear end thereof, the column of the first slider and the first spring are able to pass through the aperture.

8. The card connector as described in claim 7, further comprises a spacer assembled to a rear end of the insulating housing for guiding and receiving tails of the contacts.

9. A card connector adapted for a first card and a second card comprising:

an insulating housing defining a card insertion/ejecting direction and a space for accommodating the first card and the second card;

a plurality of contacts received in the insulating housing for electrically connecting with the first card and the second card; and an ejector received in the insulating housing and comprising a first slider adapted to be engaged with the first card, a first spring and a second spring in a parallel relationship with each other under a condition that the first spring urges the first slider; and a second slider adapted to be engaged with the second card, urged by the second spring, and engageable with the first slider in said card insertion/ejection direction; wherein one of the second spring and the first spring surrounds the other; and wherein deformation of the second spring due to insertion of the second card results in deformation of the first spring associatively while deformation of the first spring due to insertion of the first card does not result in deformation of the second spring.

10. The card connector as claimed in claim 9, wherein the first slider is equipped with a groove and a guiding pin for retaining the first slider in a position along the card insertion/ejection direction.

11. The card connector as claimed in claim 9, wherein the first slider is quipped with a groove and a guiding pin for retaining the first slider in a position along the card insertion/ejection direction while the second slider not.

12. A card connector adapted for a first card and a second card comprising:

an insulating housing defining a card insertion/ejecting direction and a space for accommodating the first card and the second card;

a plurality of contacts received in the insulating housing for electrically connecting with the first card and the second card;

an ejector received in the insulating housing and comprising a first slider adapted to be engaged with the first card, a second slider adapted to be engaged with the second card under a condition that the first slider and the second slider are engageable with each other along the card insertion/ejection direction;

a first spring urging the first slider; and a second spring urging the second slider; wherein the second slider is not actuated to move by the first slider upon insertion of the first card; wherein upon insertion of the second card into the housing, the second slider is engaged with and pushed by the second card to move to further actuate the first slider to move, thus resulting in deformation of the first spring, while upon insertion of the first card into the housing, the first slider is engaged with and pushed by the first card to move, thus resulting in deformation of the first spring; wherein the first slider is equipped with a groove and a guiding pin for retain the first slider in a position along the card insertion/ejection direction.

13. The card connector as claimed in claim 12, wherein the second slider is not equipped with any groove or guiding pin for retaining the second slider in position along the card insertion/ejection direction.

14. The card connector as claimed in claim 13, wherein the first slider helps retention of said second slider along the card insertion/ejection direction.

* * * * *